United States Patent
Zhao et al.

(10) Patent No.: US 9,137,623 B2
(45) Date of Patent: Sep. 15, 2015

(54) METHOD AND SYSTEM FOR REALIZING CONCURRENT ACCESS OF MULTI-KINDS OF BEARER PROTOCOLS ON MACHINE-TO-MACHINE (M2M) PLATFORM

(75) Inventors: Changjun Zhao, Guangdong Province (CN); Rong Wang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 953 days.

(21) Appl. No.: 13/258,272

(22) PCT Filed: Oct. 9, 2009

(86) PCT No.: PCT/CN2009/074376
§ 371 (c)(1),
(2), (4) Date: Nov. 28, 2011

(87) PCT Pub. No.: WO2010/139151
PCT Pub. Date: Dec. 9, 2010

(65) Prior Publication Data
US 2012/0113992 A1 May 10, 2012

(30) Foreign Application Priority Data
Jun. 4, 2009 (CN) .......................... 2009 1 0203285

(51) Int. Cl.
*H04W 4/00* (2009.01)
*H04W 4/14* (2009.01)
*H04L 29/06* (2006.01)
*H04L 9/32* (2006.01)
*H04L 12/28* (2006.01)
*G06F 15/16* (2006.01)
*H04W 80/04* (2009.01)
*H04W 80/06* (2009.01)

(52) U.S. Cl.
CPC ............... *H04W 4/005* (2013.01); *H04L 69/22* (2013.01); *H04W 4/14* (2013.01); *G06F 15/16* (2013.01); *H04L 9/32* (2013.01); *H04L 12/28* (2013.01); *H04L 69/16* (2013.01); *H04W 80/04* (2013.01); *H04W 80/06* (2013.01)

(58) Field of Classification Search
None
See application file for complete search history.

(56) References Cited

U.S. PATENT DOCUMENTS

| | | | |
|---|---|---|---|
| 2003/0167403 A1* | 9/2003 | McCurley et al. | ............. 713/201 |
| 2009/0217348 A1* | 8/2009 | Salmela et al. | ................... 726/2 |

FOREIGN PATENT DOCUMENTS

| | | |
|---|---|---|
| CN | 1501672 A | 6/2004 |
| CN | 101180852 A | 5/2008 |
| WO | 2008131590 A1 | 11/2008 |

OTHER PUBLICATIONS

International Search Report for PCT/CN2009/074376 dated Mar. 1, 2010.

*Primary Examiner* — Kodzovi Acolatse
(74) *Attorney, Agent, or Firm* — Ling Wu; Stephen Yang; Ling & Yang Intellectual Property

(57) ABSTRACT

One embodiment of the present invention discloses a method and system for implementing concurrent access of multiple bearer protocols in a M2M platform. The method comprises: after receiving an uplink message of a terminal, an access module of a M2M platform determining a bearer type of the uplink message, obtaining corresponding key information of the bearer type, and packaging the key information and an original datagram of the uplink message into an internal message to send to a service module of the M2M platform; and after completing a service processing flow based on the internal message, the service module packaging datagram response contents and the key information into a downlink message to send to the access module, which sends the downlink message to a terminal corresponding to the downlink message based on the key information after receiving the downlink message.

11 Claims, 3 Drawing Sheets

METHOD AND SYSTEM FOR REALIZING CONCURRENT ACCESS OF MULTI-KINDS OF BEARER PROTOCOLS ON MACHINE-TO-MACHINE (M2M) PLATFORM

TECHNICAL FIELD

The present invention relates to the M2M platform field, and more particularly, to a method and system for implementing and supporting concurrent access of multiple bearer protocols in a M2M platform.

BACKGROUND OF THE RELATED ART

The Machine-to-Machine/Man (M2M) is a networked application and service technique which takes machine terminal intelligent interaction as core. It uses wireless communication as an access means to provide a synthetic informatization solution for customers by embedding a wireless communication module into the machine so as to meet informatization requirements of the customers for aspects such as monitoring, commanding and dispatching, data collection, and measurement.

The Wireless M2M Protocol (WMMP) is an application layer protocol designed by the China Mobile for implementing data communication processes between a M2M terminal and a M2M platform, between M2M terminals, and between the M2M platform and an application platform in M2M services. Bearer protocols of the WMMP protocol include the China Mobile Peer to Peer (CMPP) short message protocol of the China Mobile, the Transmission Control Protocol/Internet Protocol (TCP/IP), the User Datagram Protocol/Internet Protocol (UDP/IP) and the Unstructured Supplementary Service Data (USSD), etc, a protocol stack structure of which is shown in FIG. 1. These different bearer protocols are applied to different M2M service flows and scenarios, for example, the CMPP is usually used when the platform calls the terminal actively, the UDP is used when the network quality is poor, the TCP is used by key information and multiple flows interaction, etc.

With the continuous popularization and application of the M2M, there are various types of terminal accesses, and the M2M platform is required to support multiple bearer protocols simultaneously.

Currently, a typical implementation method in the industry is to configure a plurality of access servers, deploy access modules of multiple bearer protocols on several servers respectively, and analyze their born WMMP protocol datagram respectively. Each access module establishes a link connection with a service module, while link maintenance function of the service module and each access module is required to be implemented to control a connection state of a terminal.

However, the above implement method has following problems.

1. A plurality of access servers is required to be configured and a plurality of access modules is required to be installed in the M2M platform, so the hardware cost is high;
2. The implementation of multiple service modules is more difficult when the capacity is expanded, and each service module is required to connect with an access module of each bearer protocol;
3. The reusability of software development is low such that the implementation of one function needs to be accomplished on a plurality of access modules;
4. Inspection problems and signaling tracking are complicated, since the bearer protocol of a terminal is required to be determined first such that the problems can be inspected and signaling can be tracked on corresponding modules.

SUMMARY OF THE INVENTION

In order to solve the existing technical problem, one embodiment of the present invention provides a method and system for implementing concurrent access of multiple bearer protocols in a M2M platform so as to implement unified management of an access module and link of the M2M platform and support WMMP concurrent access of multiple bearer protocols such as CMPP, TCP, and UDP simultaneously.

The present invention provides a method for implementing concurrent access of multiple bearer protocols in a M2M platform comprising the steps of:

after receiving an uplink message of a terminal, an access module of a Machine-to-Machine/Man (M2M) platform determining a bearer type of the uplink message, obtaining corresponding key information of the bearer type, and packaging the key information and an original datagram of the uplink message into an internal message to send to a service module of the M2M platform; and after completing a service processing flow based on the internal message, the service module packaging datagram response contents and the key information into a downlink message to send to the access module, which sends the downlink message to a terminal corresponding to the downlink message based on the key information after receiving the downlink message.

Preferably, the bearer type includes China Mobile Peer to Peer (CMPP) short message bearer, Transmission Control Protocol (TCP) bearer, and User Datagram Protocol (UDP) bearer.

The step of determining the bearer type of the uplink message comprises: the access module determining the bearer type of the uplink message based on a SOCKET link attribute of the uplink message: a message transmitted on a SOCKET link actively connected to a short message gateway is CMPP short message bearer, a message transmitted by a SOCKET connection received on a TCP interception port is TCP bearer, and a message received on a UDP interception port is UDP bearer.

Preferably, when there is a plurality of the service modules, the step of packaging the key information and the original datagram of the uplink message into the internal message to send to the service module of the M2M platform comprises:

taking a subscript of each service module as an integer;

after obtaining a sum of the last 6 character values of a terminal serial number in the uplink message and taking a modulus of the obtained sum and the number of the service modules, sending the internal message to a service module whose subscript corresponds to the modulus.

Preferably, the key information contains the bearer type, a terminal serial number and a link ID.

The step of sending the downlink message to the terminal corresponding to the downlink message comprises:

the access module determining a bearer link corresponding to the terminal based on a recorded corresponding relationship between the link ID and the terminal serial number of the terminal, and sending the downlink message to the terminal based on the determined bearer link and the bearer type in the key information.

Preferably, the key information further contains connection time or data transmission time of last time.

The method further comprises: if the access module determines, based on the connection time or the data transmission time of last time, that duration of a non-activated state of the bearer link is exceeded or no data transmission occurs in a time period, actively deleting a record of a corresponding relationship between the terminal and the bearer link.

Preferably, the step of sending the downlink message to the terminal corresponding to the downlink message further comprises: determining whether a state of the bearer link is available, and when the bearer link is disconnected or a notification that short message traffic is excess is received and the bearer type is the CMMP short message bearer, re-transmitting the downlink message after waiting for one retry interval until the transmission succeeds or an upper limit of retransmission times is exceeded.

The present invention further provides an access module for implementing concurrent access of multiple bearer protocols in a M2M platform, which comprises a communication thread, a distribution processing thread and a node communication thread, wherein the communication thread is configured to determine a bearer type of an uplink message based on a SOCKET link attribute of the uplink message sent by a terminal, and send the uplink message and its bearer type to the distribution processing thread;

the distribution processing thread is configured to decompose the uplink message based on its bearer type, and transmit processed service data in a format of an internal message to a service module of the M2M platform through the node communication thread to perform service processing; and the node communication thread is configured to implement node communication with the service module, and establish a SOCKET internal transmission data connection with the service module.

Preferably, the access module further comprises a terminal connection control thread configured to monitor a state of a bearer link corresponding to the terminal.

The distribution processing thread is further configured to query whether the state of the bearer link corresponding to the terminal is available from the terminal connection control thread when the downlink message is transmitted to the terminal, and transmit the downlink message if the state of the bearer link corresponding to the terminal is available.

Preferably, the communication thread is configured to determine the bearer type of the uplink message using the following manners: a message transmitted on a SOCKET link actively connected to a short message gateway is CMPP short message bearer, a message transmitted by a SOCKET connection received on a TCP interception port is TCP bearer, and a message received on a UDP interception port is UDP bearer.

Preferably, the access module further comprises a retrying and return receipt processing thread.

The distribution processing thread is further configured to, when a downlink message is sent to the terminal, if the bearer link is disconnected or a notification that short message traffic is excess is received and the bearer type is the CMMP short message bearer, send the downlink message to the retrying and return receipt processing thread, re-transmit the downlink message after waiting for one retry interval until the transmission succeeds or an upper limit of retransmission times is exceeded, and send the downlink message to the retrying and return receipt processing thread for storing temporarily after the transmission succeeds.

The present invention further provides a system for implementing concurrent access of multiple bearer protocols in a M2M platform comprising the above-described access module and a service module configured to package datagram response contents into a downlink message in a format of an internal message to send to a node communication thread of the access module based on the received internal message after a service processing flow is completed.

Preferably, there is a plurality of service modules. The distribution processing thread of the access module is configured to distribute the internal message to a specific service module using the following strategy:

taking a subscript of each service module as an integer;

after obtaining a sum of the last 6 character values of a terminal serial number in the uplink message and taking a modulus of the obtained sum and the number of the service modules, sending the internal message to a service module whose subscript corresponds to the modulus.

In sum, the embodiment provides a method and system for implementing and supporting concurrent access of multiple bearer protocols, unified management of link maintenance, and unified interface of service engines. Using the method and system of the embodiment, WMMP concurrent access of bearer protocols such as CMPP, TCP, and UDP can be implemented and supported simultaneously in a M2M platform, thereby shielding a coupling relationship between a service layer and an access layer of the M2M platform, and achieving distributed deployment of multiple service modules flexibly. Therefore, the complexity of access modules in the case of various bearer protocols in the M2M platform is solved, and the hardware cost and the maintenance cost of the M2M platform are saved.

PREFERRED EMBODIMENTS OF THE PRESENT INVENTION

A core concept of the present invention is that a unified single point access module is used to implement access of multiple bearer protocols in a M2M platform; functions of a service module and an access engine are separated, and the service module processes in a unified way the packaged service messages independent of the actual bearer protocols; and the access module and the service module use a unified package message transfer mode.

The present invention will be further described in detail in conjunction with the accompanying figures and particular embodiments.

Figure 1:
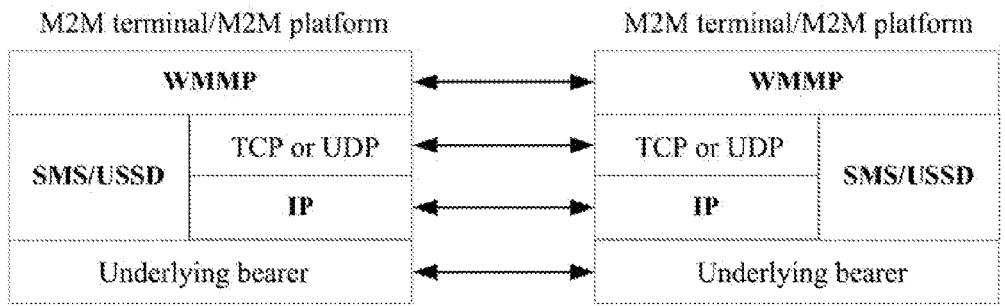
FIG. 1 is a diagram of a WMMP protocol stack structure.
Figure 2:
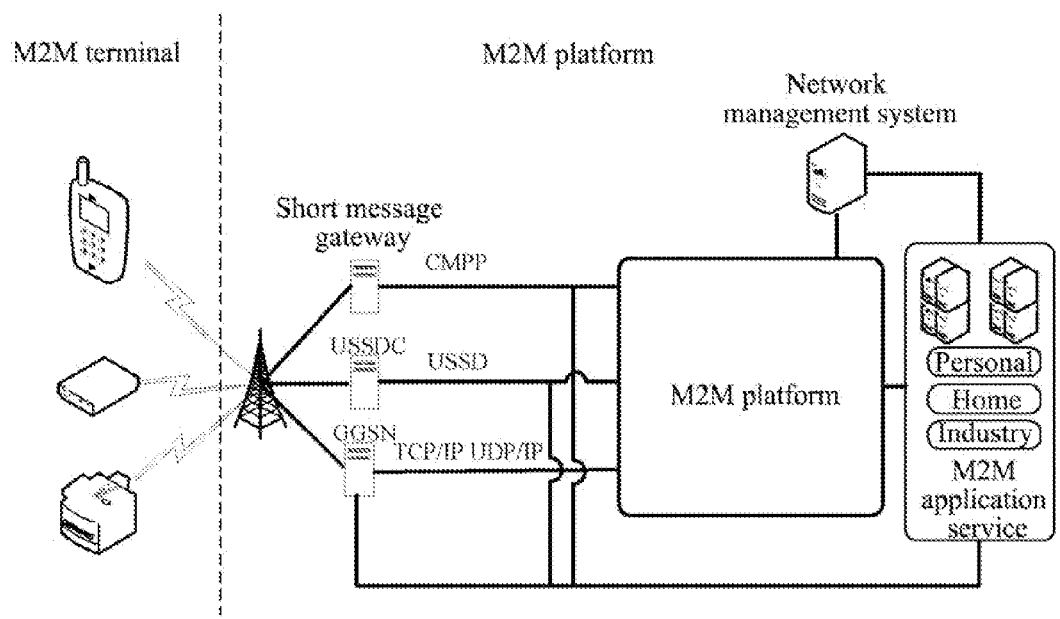
FIG. 2 is a networking diagram of a M2M platform.

As shown in FIG. 2, a M2M platform is externally connected to nodes such as a short message gateway, Gateway GPRS Support Node (GGSN), and USSD center (USSDC), etc., and M2M protocol WMMP communicating with a terminal, which is used for transmitting management stream data between the terminal and the platform and service stream data between the terminal and an application platform, is on an underlying bearer. The WMMP protocol is composed of an interface protocol (WMMP-T) between a M2M platform and a M2M terminal and an interface protocol (WMMP-A) of a M2M platform and a M2M application. The WMMP-T protocol achieves data communication between the M2M platform and the M2M terminal, and end-to-end data communication between M2M terminals implemented by means of forwarding or routing of the M2M platform; while the WMMP-A protocol achieves data communication between the M2M platform and the M2M application, and end-to-end data communication between the M2M terminal and the M2M application implemented by means of forwarding or routing of the M2M platform. The present invention mainly relates to the WMMP-T protocol, and for the sake of convenient description, all the WMMP protocols in the present invention refer to the WMMP-T portion, unless otherwise stated.

Figure 3:
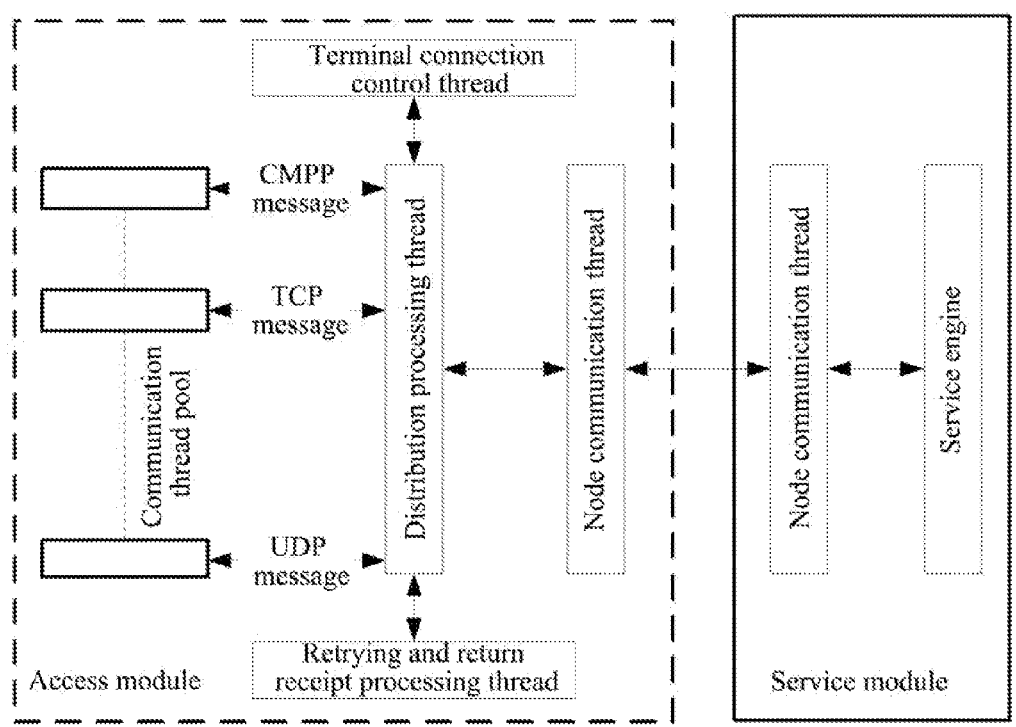
FIG. 3 is a schematic diagram of a system for implementing concurrent access of multiple bearer protocols in accordance with an embodiment of the present invention.

As shown in FIG. 3, the system in accordance with the embodiment of the present invention is mainly comprises an access module and a service module. The access module of this embodiment, which is mainly modified, comprises a communication thread pool.

Since the system is required to maintain one SOCKET link for each terminal when the UDP/TCP bears a protocol, for example, when the UDP bears the protocol, the SOCKET in the UDP mode is required to receive datagram from the terminal and send UDP datagram to the terminal, and when the TCP bears the protocol, a great deal of SOCKET communication links are required to be maintained for each terminal. In order to support parallel receiving and transmitting of datagram upon concurrent access of a large quantity of terminals, the system establishes one communication thread pool, wherein each thread is used for maintaining its own SOCKET connection, completing the receiving and transmitting of a message on the SOCKET layer level, maintaining states of connection and disconnection of the SOCKET link, and notifying timely a terminal connection control thread of connection and disconnection of the link so as to control the connection state of the terminal.

The management of the link by the communication thread poor will be described below.

The system establishes M communication threads upon initialization, while establishing N link state arrays, wherein N is the maximum number of simultaneous connections supported by the system. A link group is allocated to a communication thread for management upon the initialization of the system, the relationship of the allocated link group managed by each thread is established, and parallel receiving and transmitting of multi-thread messages are implemented. The following allocation principle is used particularly: each link is endowed with one of subscripts L0, L1, . . . , LN-1, and IDs T0, T1, . . . , TM-1 are allocated to the communication threads respectively; the link managed by each communication thread performs an operation for obtaining the remainder of M through the ID of the link and determines the communication thread which manages the link based on the ID of the tread corresponding to the remainder.

A main role of the communication thread in the present invention is to maintain the SOCKET communication link. In addition, particular operations of establishing SOCKET links are different for different bearer protocols.

(1) SMS bearer way: a M2M platform establishes a client SOCKET, actively connects a short message gateway, and transmits the CMPP short message protocol on the SOCKET connection.

(2) UDP bearer way: a platform establishes SOCKET interception of the UDP mode, receives UDP datagram of all terminals, allocates the SOCKET of the UDP to the system when the UDP datagram is sent to the terminals, and sends the datagram to the terminals.

(3) TCP bearer way: a platform allocates SOCKET interception of the TCP mode, waits for connection of a terminal, and once the terminal initiates the SOCKET connection, the platform allocates one SOCKET corresponding to the terminal, both establish one link on the TCP protocol and transmit WMMP datagram on the link.

A terminal connection control thread is mainly configured to complete control of the terminal connection born on the TCP/UDP, monitor a state of each link, and close timely the link required to be closed to ensure reuse of system network resources. Specifically, a corresponding relationship between the SOCKET link and a serial number of the specific terminal is established first. When the first datagram after the terminal is connected is received, the terminal connection control tread records the corresponding relationship between the SOCKET link and the serial number of the terminal, generates a terminal connection state record so as to find the corresponding bearer type of the terminal and bearer link when the datagram is sent actively, and sends the datagram to the terminal (where key information is notified to the terminal connection control thread for recording after the distribution processing thread has extracted the key information), and when a notification that the SOCKET link sent by the communication thread (through the distribution processing thread) is disconnected is received, eliminates the corresponding terminal connection record.

The distribution processing thread is configured to decompose a Mobile Originated/Mobile Terminated (MO/MT) message of each bearer protocol, fill corresponding control fields, and package the message into an internal communication message to send to a service module through a node communication thread so as to shield a coupling relationship between a service layer and an access layer. In addition, the distribution processing thread is required to query whether the link state of the terminal is available from the terminal connection control thread after receiving a downlink datagram request. As mentioned above, the terminal connection control thread is responsible for storing, managing and maintaining the record of the corresponding relationship between the key information and the terminal.

The node communication thread is configured to implement node communication with the service module, and establish a reliable SOCKET internal transmission data connection with the service module. Herein the internal transmission data refers to service data processed by the distribution processing thread. In addition, the access module is able to connect with a plurality of service modules through node communication to implement load sharing of the plurality of service modules. When there is a plurality of service modules, the distribution processing thread is required to provide an indication to a destination node.

Since a MT message of the CMPP protocol is required to support retrying mechanism, a retrying and return receipt process thread is also required to store the original message after receiving a submission short message response (CMPP_SUBMIT_RESP), and wait for a return receipt, the functions of which are processed by the retrying and receipt process thread.

A flow required to be processed by the retrying and receipt process thread will be described below.

When the distribution processing thread sends a downlink message of the service module and the bearer mode is short message, if the link with a short message gateway is disconnected instantaneously at the sending moment or the CMPP_SUBMIT_RESP responded by the short message gateway notifies the platform that the traffic of the sent short messages is excess, then the message is required to be transmitted to the retrying and receipt process thread. The message is resent after one retrying interval until it is sent successfully or the upper limit of resending times is exceeded. If the distribution processing thread sends the message successfully, the original message is required to be sent to the retrying and receipt process thread for storing temporarily. Only after the short message gateway sends the return receipt message of the CMPP to the distribution processing thread, the distribution processing thread transfers the return receipt to the retrying and receipt process thread, which finds the original message based on the message ID in the return receipt and then performs retrying processing (the incorrect return receipt) or outputs a service telephone bill (the successful return receipt) according to actual service requirements.

Figure 4:
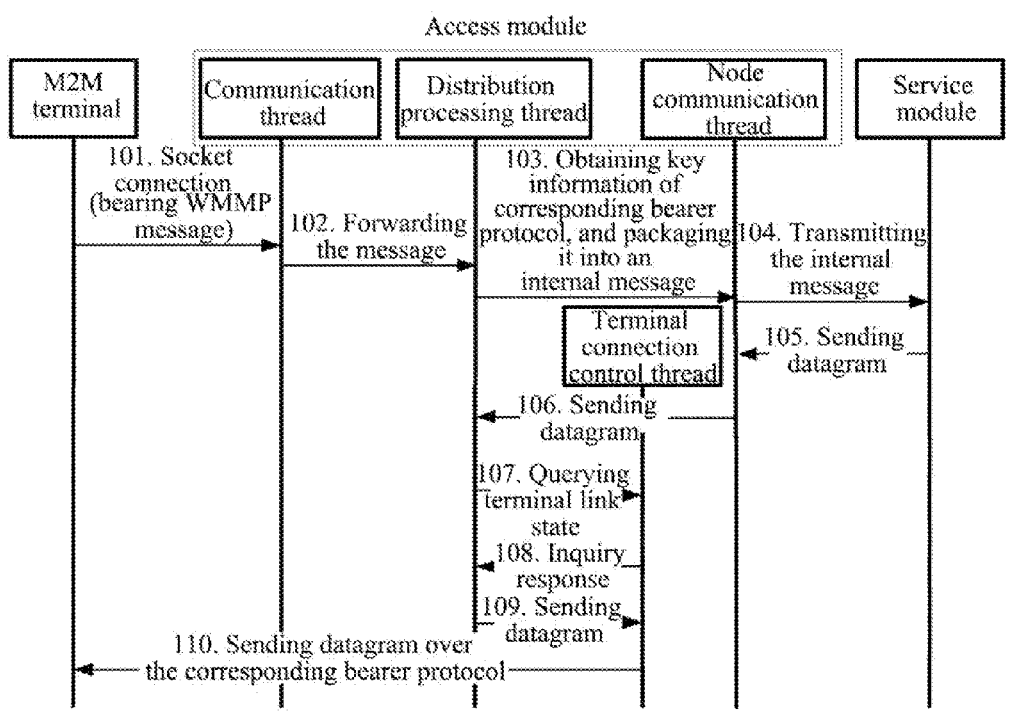
FIG. 4 is a flow chart of a method for implementing concurrent access of multiple bearer protocols in accordance with an embodiment of the present invention.

FIG. 4 is a flow chart of a method for implementing concurrent access of multiple bearer protocols in a M2M platform according to an embodiment of the present invention, which mainly comprises the following steps.

101, A SOCKET link between a terminal and an access module of a M2M platform is established for bearing a WMMP message;

102, A communication thread determines the bearer type of an uplink message based on its SOCKET link attribute after receiving the uplink message of the terminal, wherein a message transmitted on a SOCKET link actively connected to a short message gateway is CMPP short message bearer, a message transmitted by a SOCKET connection received on a TCP interception port is TCP bearer, and a message received on a UDP interception port is UDP bearer. Key information such as a remote port of the terminal and an ID of a link (a subscript of link data corresponding to this datagram transmission) is obtained by the SOCKET connection, and is forwarded to the distribution processing thread so as to subsequently send the downlink message to the corresponding terminal based on contents of the key information.

103, The distribution processing thread obtains key information of the corresponding bearer protocol after receiving the message, and forwarding the message to a service module by a node communication thread of an access module based on a distribution strategy for multiple service modules after packaging the message into an internal message.

Additionally, after extracting the key information, the distribution processing thread will notify a terminal connection control thread of the key information for recording after this step by separately sending the message or when the bearer link state is queried after the downlink datagram is received (namely step 107), which is not shown in the figure. The terminal connection control thread is responsible for storing, managing and maintaining a record of a corresponding relationship between the key information and the terminal after receiving the key information.

In this step, the distribution strategy for multiple service modules may be implemented by obtaining a sum of the last 6 character values of a terminal serial number and taking a modulus of the obtained sum and the number of the modules so as to send certain datagram of the terminal to the service module with the corresponding subscript for processing.

For example, after the distribution processing thread receives the uplink datagram of the terminal, it extracts a serial number A00100010800FFD0 from a datagram header. The node communication thread connects 3 service modules in total, subscripts of which are 0, 1, and 2 respectively. The distribution processing thread sums each character value of a character string: '0'+'0'+'F'+'F'+'D'+'0'=48+48+70+70+68+48=352, then obtains a modulus of the obtained sum and the number of the service modules 3, i.e., mod(352,3)=1, and sends the datagram to a service module with a subscript of 1 for processing.

104, The node communication thread transmits the internal message to the corresponding service module.

105, The service module assembles the responded datagram message and the key information into a downlink message after completing the processing flow of corresponding services, and sends the downlink datagram to the node communication thread of the access module through the node communication thread of the service module.

106, The node communication thread of the access module transmits the downlink datagram to the distribution processing thread.

107, The distribution processing thread sends a request for querying the link state of the terminal to the terminal connection control thread.

108, The terminal connection control thread returns a query response indicating whether the link state of the terminal is available.

109, The distribution processing thread sends the downlink datagram to the terminal connection control thread in the case where the current link is available based on the above query response, and when the current link is unavailable, the downlink datagram will be processed in other ways.

110, The terminal connection control thread sends the datagram to the corresponding terminal based on the record of the corresponding relationship between the key information and the terminal.

In the above flow, the key information required to be obtained by the distribution processing thread is different for different bearer protocols. Message processing ways for various bearer protocols will be further described in detail separately.

1. Access Support of the CMMP Short Message

When an access mode is activated, it, as a Service Provider (SP), establishes a connection to a short message gateway. Specifically, the access module allocates one idle link upon initialization, further allocates one client SOCKET, initiates the connection to the short message gateway, sends a CONNECT message of the CMPP protocol after establishing the SOCKET connection, establishes a short message transmission channel to the short message gateway after obtaining a success response message CONNECT RESP of the gateway, and maintains the short message transmission long link by a link detection message. The short message link controls the receiving and transmitting of the message by the corresponding communication threads, and once the link is disconnected, a re-connection operation is initiated in a short time.

Information of each short message datagram is required to be extracted and processed by the distribution processing thread, and the processing process comprises:

(1) extracting a mobile phone number and a UDHI identifier of the uplink message of the CMPP short message; and (2) extracting a datagram header of the WMMP message transmitted in a content field of the uplink message of the CMMP short message to obtain a serial number of the terminal.

After the extracting and processing of the information, it is assembled into an internal message format, and the extracted key information required to be recorded is stored into the header of the internal message. The key information obtained in the short message bearer way includes the bearer type, mobile telephone number, terminal serial number, connection time, and User Data Header Indicator flag.

The distribution process module assembles the key information and the original WMMP datagram into a new internal message format, and transmits the internal message composed of the key information and the WMMP original datagram to the node communication thread, which transmits the message to the service module to perform service processing based on the distribution strategy of multiple service modules.

The service module assembles the responded datagram message and the key information into the downlink message after processing the WMMP datagram according to the processing flow of the corresponding services, and transmits the downlink message to the access module through the node communication thread of the service module. The access module knows, from the key information, that the bearer way of the datagram is the short message, and also obtains the mobile telephone number of the terminal therefrom, and sends the message to the short message gateway by the CMPP protocol, and further arrives at the M2M terminal.

2. Access Support of the UDP

The UDP is a connectionless and unreliable protocol, and its transmission efficiency is better than that of the TCP. The communication thread obtains the IP address and port where a terminal sends the UDP message after receiving a WMMP protocol packet of the terminal, and sends the IP address and port to the distribution processing thread together with the original WMMP datagram. The distribution processing thread extracts information from the received WMMP protocol, and key information required to be recorded includes the bearer type, remote IP, remote port, connection time, and terminal serial number.

Roles of the key information are that: a. when the service module is unable to return the datagram to the terminal, it can determines duration of the non-activated state of the link by establishing connection time, and the terminal connection control thread actively clears away a terminal connection record corresponding to the terminal to indicate that the downlink datagram is unable to be actively sent to the terminal by the UDP bearer; b. the access module transmits the message to the terminal through the remote IP and port after receiving the returned datagram of the service module, and closes the link; c. a underlying layer link is actively closed, notifies the control thread through the link ID, and further notifies the service module to release terminal resources of the connection.

3. Access Support of the TCP

The terminal is sometimes required to transmit a lot of WMMP interaction datagram, and at this point the TCP bearer protocol with connection is usually used to transmit the datagram. A method for controlling the TCP connection will be described below.

Each terminal establishes only one TCP link at the same moment. Specifically, the M2M platform allocates the SOCKET of the TCP type when activated, and performs connection interception on a specific port. The terminal initiates a connection to the platform through the SOCKET, and the platform allocates a corresponding SOCKET to communicate with the terminal after intercepting that the SOCKET receives a connection request of the terminal, and records the corresponding SOCKET into one idle link information array. The WMMP protocol defines a unique terminal serial number of 16 bytes for each terminal, and each interaction datagram is required to carry the terminal serial number for authentication. The terminal connection control thread extracts the terminal serial number of each connection, and checks whether the TCP connection with the same serial number exists at present, and if it exists, the previously established link is required to be actively closed.

Preferably, each TCP connection state is checked in real-time. If there is no data transmission in a time period (for example 5 seconds), the platform may actively close the link to prevent certain terminals from connecting with the platform even when there is no datagram interaction and wasting connection resources.

The key information of the TCP connection which is required to be recorded includes the bearer type, remote IP, remote port, terminal serial number, link ID, and transmission data time of last time, etc.

The remote port is obtained by the communication thread through the SOCKET connection; the link ID is a subscript of link data recording the datagram transmission of this time; and the terminal serial number is extracted from the datagram header of the WMMP datagram content.

The processing of the message by the distribution processing thread will be described now. A new node communication structure body is established for the received message packet on each bearer protocol. The structure body stores uniformly the key information in a plurality of bearer ways, namely one common structure body is used to store messages of many types, including message header and message body. The message header of node communication in accordance with the embodiment of the present invention is shown as follows:

```
typedef struct
{
    INT8      Protocol_Type;              // 1 WMMP-T 2 WMMP-A
    INT8      Bear_Protocol;              // 1 TCP/IP 2 UDP/IP
                                          // 3 SMS(WMMP-T only)
                                          //4 USSD(WMMP-T only)
    INT8      msisdn[MAX_ADDR_LEN];       // terminal number, cmpp is valid
    INT8      ip[IP_ADDRESS_LEN];         // remote IP, UDP is valid
    INT32     port;                       // remote port, UDP is valid
    UINT32    linkId;                     // TCP connection link ID, TCP is valid
    UINT32    udhi;                       // UDHI flag, short message bearer is valid
    UINT32    time;                       // link establishing time
} T_InMsgHead;
```

The message body of the node communication uses actual contents of the received datagram for filling in a unified way.

It can be seen that, by the integration of the key information, namely the processing of the key information in different bearer ways illustrated above, a separation mode where the link is controlled by the access module and the service information is processed by the service module can be implemented such that the single access module can support all the bearer modes and the M2M platform software architecture where services are independent of access.

In sum, the method and system in accordance with the embodiment of the present invention for implementing unified access of multiple bearer ways and the separation of the service module and the access in the M2M platform provide a simple method for supporting multiple service modules for the M2M platform, which can reduce the construction cost, improve the system expansibility, and have significant economy benefits and social benefits.

It should be understood that although the implementation of the system is described in detail hereinabove, it is not a limit to the patent protection scope of the invention, which is subject to the attached claims.

INDUSTRIAL APPLICABILITY

Comparing with the prior art, the method and system in accordance with the embodiment of the present invention can implement WMMP concurrent access of bearer protocols such as CMPP, TCP, and UDP simultaneously in a M2M platform, thereby shielding a coupling relationship between a service layer and an access layer of the M2M platform, and achieving distributed deployment of multiple service modules flexibly. Therefore, the complexity of access modules in the case of various bearer protocols in the M2M platform is solved, and the hardware cost and the maintenance cost of the M2M platform are saved.

What is claimed is:

1. A method for implementing concurrent access of multiple bearer protocols in a M2M platform comprising the steps of:
after receiving an uplink message of a terminal, an access module of a Machine-to-Machine/Man (M2M) platform determining a bearer type of the uplink message, obtaining corresponding key information of the bearer type, and packaging the key information and an original datagram of the uplink message into an internal message to send to a service module of the M2M platform; and
after completing a service processing flow based on the internal message, the service module packaging datagram response contents and the key information into a downlink message to send to the access module, and the access module sending the downlink message to a terminal corresponding to the downlink message based on the key information after receiving the downlink message;
wherein the key information contains the bearer type, a terminal serial number and a link ID;
the step of sending the downlink message to the terminal corresponding to the downlink message comprises:
the access module determining a bearer link corresponding to the terminal based on a recorded corresponding relationship between the link ID and the terminal serial number of the terminal, and sending the downlink message to the terminal based on the determined bearer link and the bearer type in the key information.

2. The method according to claim 1, wherein
the bearer type includes China Mobile Peer to Peer (CMPP) short message bearer, Transmission Control Protocol (TCP) bearer, and User Datagram Protocol (UDP) bearer;
the step of determining the bearer type of the uplink message comprises:
the access module determining the bearer type of the uplink message based on a SOCKET link attribute of the uplink message: a message transmitted on a SOCKET link actively connected to a short message gateway is CMPP short message bearer, a message transmitted by a SOCKET connection received on a TCP interception port is TCP bearer, and a message received on a UDP interception port is UDP bearer.

3. The method according to claim 2, wherein the key information further contains connection time or data transmission time of last time; the method further comprises: if the access module determines, based on the connection time or the data transmission time of last time, that duration of a non-activated state of the bearer link is exceeded or no data transmission occurs in a time period, actively deleting a record of a corresponding relationship between the terminal and the bearer link.

4. The method according to claim 2, wherein the step of sending the downlink message to the terminal corresponding to the downlink message further comprises: determining whether a state of the bearer link is available, and when the bearer link is disconnected or a notification that short message traffic is-in excess is received and the bearer type is the CMMP CMPP short message bearer, re-transmitting the downlink message after waiting for one retry interval until the transmission succeeds or an upper limit of retransmission times is exceeded.

5. The method according to claim 3, wherein the step of sending the downlink message to the terminal corresponding to the downlink message further comprises: determining whether a state of the bearer link is available, and when the bearer link is disconnected or a notification that short message traffic in excess is received and the bearer type is the CMPP short message bearer, re-transmitting the downlink message after waiting for one retry interval until the transmission succeeds or an upper limit of retransmission times is exceeded.

6. The method according to claim 1, wherein when there is a plurality of the service modules, the step of packaging the key information and the original datagram of the uplink message into the internal message to send to the service module of the M2M platform comprises:
taking a subscript of each service module as an integer;
after obtaining a sum of the last 6 character values of a terminal serial number in the uplink message and taking a modulus of the obtained sum and the number of the service modules, sending the internal message to a service module whose subscript corresponds to the modulus.

7. An access server of a Machine-to-Machine/Man (M2M) platform, comprising a processor and a non-transitory computer-readable medium in which a set of processor executable instructions are stored and when the instructions are executed, it causes the processor to perform following steps of multiple threads in an access module for implementing concurrent access of multiple bearer protocols in the M2M platform, the steps comprising:
a communication thread, determining a bearer type of an uplink message based on a SOCKET link attribute of the uplink message sent by a terminal, and sending the uplink message and its bearer type to a distribution processing thread;
the distribution processing thread, decomposing the uplink message based on its bearer type, and transmitting processed service data in a format of an internal message to a service module of the M2M platform through a node communication thread to perform service processing; and
the node communication thread, implementing node communication with the service module, and establishing a SOCKET internal transmission data connection with the service module;
wherein the communication thread determining the bearer type of the uplink message using the following manners: a message transmitted on a SOCKET link actively connected to a short message gateway is China Mobile Peer to Peer (CMPP) short message bearer, a message transmitted by a SOCKET connection received on a TCP interception port is TCP bearer, and a message received on a UDP interception port is UDP bearer;

the distribution processing thread, when a downlink message is sent to the terminal, if the bearer link is disconnected or a notification that short message traffic in excess is received and the bearer type is CMPP short message bearer, further sending the downlink message to a retrying and return receipt processing thread, retransmitting the downlink message after waiting for one retry interval until the transmission succeeds or an upper limit of retransmission times is exceeded, and sending the downlink message to the retrying and return receipt processing thread for storing temporarily after the transmission succeeds.

8. The access server according to claim 7, wherein the access module further comprises a terminal connection control thread, monitoring a state of a bearer link corresponding to the terminal;

the distribution processing thread further querying whether the state of the bearer link corresponding to the terminal is available from the terminal connection control thread when the downlink message is transmitted to the terminal, and transmitting the downlink message if the state of the bearer link corresponding to the terminal is available.

9. A system for implementing concurrent access of multiple bearer protocols in a M2M platform comprising the access server according to claim 8, wherein the processor further performing following step of a service module: packaging datagram response contents into a downlink message in a format of an internal message to send to the node communication thread of the access module based on the received internal message after a service processing flow is completed.

10. A system for implementing concurrent access of multiple bearer protocols in a M2M platform comprising the access server according to claim 7, wherein the processor further performing following step of a service module: packaging datagram response contents into a downlink message in a format of an internal message to send to the node communication thread of the access module based on the received internal message after a service processing flow is completed.

11. The system according to claim 10, wherein there is a plurality of service modules and the processor further performing steps:

the distribution processing thread of the access module distributing the internal message to a specific service module using the following strategy:

taking a subscript of each service module as an integer;

after obtaining a sum of the last 6 character values of a terminal serial number in the uplink message and taking a modulus of the obtained sum and the number of the service modules, sending the internal message to a service module whose subscript corresponds to the modulus.

* * * * *